Figure 1:
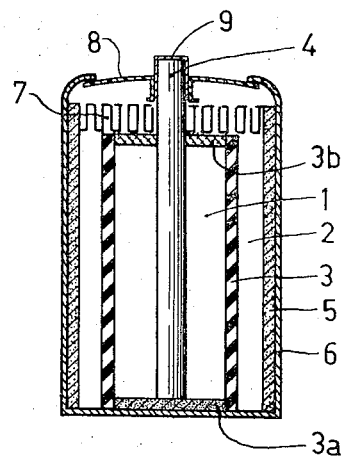

United States Patent [19]
Oomen et al.

[11] 3,769,089
[45] Oct. 30, 1973

[54] PRIMARY ELECTROCHEMICAL CELL

[75] Inventors: Joris Jan Cornelis Oomen; Frans Cornelis Romeijn; Günther Schwandt, all of Emmasingel, Eindhoven, Netherlands

[73] Assignee: U. S. Philips Corporation, New York, N.Y.

[22] Filed: July 8, 1971

[21] Appl. No.: 160,607

[30] Foreign Application Priority Data
July 8, 1970  Netherlands.................. 7010059
June 29, 1971 Netherlands.................. 7108934

[52] U.S. Cl............................................. 136/83 R
[51] Int. Cl. ........................................ H01m 21/00
[58] Field of Search................ 136/86 S, 86 R, 137, 136/120, 83 R, 6

[56] References Cited
UNITED STATES PATENTS
3,260,620  7/1966  Gruber................................. 136/86

FOREIGN PATENTS OR APPLICATIONS
231,013  12/1893  Great Britain.................... 136/86 R

OTHER PUBLICATIONS

Benjamin, "The Voltaic Cell" First Edition, 1893, pages 320 and 326–327.

R. Jasinsky, "High-Energy Batteries," 1967, pages 67–68.

Primary Examiner—Anthony Skapars
Attorney—Frank R. Trifari

[57] ABSTRACT

A primary electrochemical cell consisting of a cathode half-cell in which a halogenate is used as a depolarizer, and an anode half-cell in which phosphorus is used as a reactant and also a mediator which enhances the conversion of phosphorus into phosphoric acid.

14 Claims, 4 Drawing Figures

PRIMARY ELECTROCHEMICAL CELL

The invention relates to a novel primary electrochemical cell having a large energy content.

Different kinds of primary electrochemical cells are known. In this specification and in the claims a primary electrochemical cell may also be called a primary cell. The primary cell currently most used is undoubtedly the cell according to Leclanche (manganese dioxide/ammonium chloride, zinc cell). Other primary cells which are used in practice are the alkaline manganese dioxide cell, the mercury oxide cell and the alkaline silver oxide cell.

For many uses it is important that the energy density per unit volume or per unit of weight is large. For the different types of primary cells the maximum theoretical energy density may be calculated from the quantity of electro-chemically active material which is present per unit volume or per unit of weight and the open cell voltage (EMF of the open cell). Thus for the manganese dioxide/ammonium chloride/zinc cell it can be calculated that the maximum theoretical energy density per unit volume is 1,475 Wh/cu. dm and is 280 Wh/kg per unit of weight.

The general aim for structural elements of comparatively small dimensions for use in electric and electronic equipment is also linked up with the aim for manufacturing comparatively small primary cells of a relatively large energy density.

An important condition for making such cells having a relatively large energy density is that the reactants used therein are capable of supplying or taking up much charge per gram molecule.

An object of the present invention is to provide a primary cell of large energy density per unit volume or per unit of weight in which such reactants are used.

Such a cell in which a halogenate is used as a cathode reactant (depolarizer) is known from the book by R. Jasinski, entitled "High-energy batteries," (1967), pages 67 and 68. This book describes, for example, a primary cell which contains a zinc anode, potassium iodate as a cathode reactant (depolarizer) and an electrolyte mainly consisting of sulphuric acid of the following composition: 8N $H_2SO_4$ + 0.5 N HCl + 2 percent by weight of $HgCl_2$. A mixture of $KIO_3$ (57 percent by weight), graphite (40.8 percent by weight) and acetylene black (2.1 percent by weight has been used as a cathode mass.

It is assumed that the discharge reactions of this cell may be represented as follows:
Anode half-cell: $Zn \rightarrow Zn^{2+} + 2e^-$
Cathode half-cell: $IO_3^- + 6H^+ + 5e^- \rightarrow \frac{1}{2} I_2 + 3H_2O$.

This shows that the reactant used (the iodate ion) supplies much charge upon the reduction to iodine per gram molecule during the reaction taking place in the cathode half-cell (the cathode reaction). It can, however, also be seen that acid ($H^+$ ions) is consumed during the cathode reaction. In other words, in this system a reactant is consumed which takes up only comparatively little charge per gram ion. As a result the capacity of such a cell, despite the fact that a cathode reactant (iodate) is used therein, which supplies much charge per gram molecule, is determined and hence limited by the quantity of a reactant ($H^+$ ion) which can take up only comparatively little charge per gram ion. This reactant is not reformed in the cell; therefore it must be taken up in the cell during manufacture. The quantity of this reactant in the cell actually determines (and limits) the energy content of the cell.

A further drawback of the known cell is that the zinc electrode is not acid resistant and is therefore attacked by the acid present in the cell. As a result the lifetime of this electorde and hence that of the cell is limited.

Another object of the present invention is to provide a primary cell of large energy density per unit volume or per unit of weight in which a reactant which can supply much charge per gram molecule is used as a cathode reactant and which cell does not have the drawback that the energy density is actually determined by the quantity of a reactant present in the cell and being capable of taking up comparatively little charge per gram ion or per gram molecule.

The invention is based on the recognition of the fact that an anode half-cell is used in the primary cell according to the invention in which the reactant which is consumed during the cathode reaction and which takes up only comparatively little charge per gram ion or per gram molecule is formed during the anode reaction taking place in this anode half-cell.

A further object of the invention is that the reactant referred to in the previous paragraph is formed during the anode reaction in a quantity which is substantially equal to that which is consumed during the cathode reaction (or this reactant) and that this reactant is transported from the anode half cell to the cathode half-cell to such an extent that the quantity of this reactant consumed in the cathode half-cell is substantially compensated thereby.

A further object of the invention is to provide an acid primary cell having an acid resistant anode of a long lifetime.

This object and further objects of the invention are realized by a combination of two half-cells in a primary cell in which a halogenate is used as a reactant (depolarizer) in the cathode half-cell and phosphorus is used as a reactant in the anode half-cell.

Phosphorus is known to be a comparatively little reactive material. This implies that phosphorus cannot be used as a reactant in the anode half-cell without further precautions.

However, it has been found that phosphorus as a reactant may be used in the anode half-cell if an activator (also sometimes called mediator) is also present therein, which activator enhances the conversion of phosphorus into phosphoric acid. It was found that iodine is such an activator (mediator). Iodine is reformed during a further reaction taking place in the anode half-cell.

It is assumed that of the reactions taking place in the anode half-cell reaction (a) takes place in the solution and reaction (b) takes place at the electrode and this as follows:
Reaction (a):
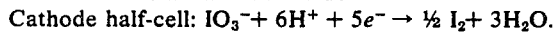
$2P + 8H_2O + 5I_3^- \rightarrow 3H_3PO_4 + 10H^+ + 15 I^-$.
Reaction (b)
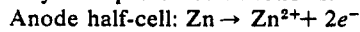
$15 I^- \rightarrow 5I_3^- + 10e^-$.
The overall reaction may then be represented by the following equation:
$P + 4H_2O \rightarrow H_3PO_4 + 5H^+ + 5e^-$.

Iodine (in molecular or ionic form) acts on the one hand as an activator (mediator) during oxidation of phosphorus to phosphoric acid (reaction (a)) and on the other hand as a depolarizer (reaction (b)). However, since during reaction (b) the same quantity of $I_3^-$ is formed as is consumed during reaction (a), a small quantity of iodine in the anode half-cell may be sufficient.

The reaction in the cathode half-cell may be represented by the equation (when using chlorate as a halogenate):

Reaction (c):

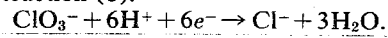
$ClO_3^- + 6H^+ + 6e^- \rightarrow Cl^- + 3H_2O.$

It can be seen from the reaction equations that the drawback of the known cell in which a halogenate is used as a cathode depolarizer, namely a reactant in this case being a $H^+$ ion, which can take up only comparatively little charge per gram ion in the cathode half cell may be obviated if steps are taken by which the reactant ($H^+$ ion) formed in the anode half-cell can be sufficiently transported to the cathode-half-cell. The latter is realized in the primary cell according to the invention by using a separator which is permeable to hydrogen ions and to water. The separator should also be permeable to water in order that the water formed in the cathode half-cell can at least partly be transported to the anode half-cell. This is important in connection with the formation of phosphoric acid in the anode half-cell (see reaction (a)).

The invention relates to a primary cell which contains an aqueous solution of an acid as an electrolyte consisting of a cathode half-cell and an anode half-cell separated by a separator permeable to hydrogen ions and water, the cathode half-cell containing a halogenate as a depolarizer and the anode half-cell containing phosphorus as a reactant and also a mediator which enhances the conversion of phosphorus into phosphoric acid.

It has been found that iodine is eminently suitable as a mediator which enhances the conversion of phosphorus into phosphoric acid under the circumstances as exist in the anode half-cell of an operating primary cell according to the invention. Furthermore, it was found that iron salts, for example, a combination of ferrous and ferric chloride may be used as a mediator. Copper salts, for example, cupribromide, preferably with the addition of an alkali bromide, for example, potassium bromide may alternatively be used as mediators.

The primary cell according to the invention will be further described hereinafter. It is to be noted that the invention is not limited to the embodiments of the cell or its components described.

The nomenclature which is used in handbooks and other literature relating to the constituents of primary cells is fairly different.

In the description and claims the halogenate used in the cathode half-cell is indicated as a depolarizer or cathode reactant, phosphorus is indicated as an anode reactant and iodine (in the forms occurring in the anode half-cell) is indicated as a mediator. This implies that the solid conducting material, for example, carbon black to which electrons are supplied in the anode half-cell according to the previously mentioned reaction (b) is indicated as an electrode (anode) and such material which provides electrons in the cathode half-cell (see the previously mentioned reaction (c)) is likewise indicated as electrode (cathode).

In a primary cell according to the invention electrodes consisting of carbon in the form of graphite powder, graphite fibre, graphite felt or graphite foam or of carbon black for example, acetylene black may be used. Semiconducting tin oxide is also suitable as an electrode material, especially in the cathode half-cell.

It was found that the EMF of the primary cell according to the invention and the performance under load of the cell are favourably influenced when gas black (acetylene black) or graphite fibres is (are) used for the composition of the anode half-cell.

The electrode material is introduced into or mixed with the constituents of the materials used in the cathode half-cell and in the anode half-cell, respectively.

For the composition of a cathode half-cell a mixture may be used of, for example, 100 parts by weight of sodium chlorate, 25 parts by weight of graphite and 100 parts by weight of a 2 N sulphuric acid solution in water. For the composition of an anode half cell, for example, 100 parts by weight of phosphorus in a pulverulent form, 1 part by weight of iodine, 20 parts by weight of carbon black and 200 parts by weight of a 2N sulphuric acid solution in water may be used.

Suitable halogenates are chlorates, bromates and iodates of alkali metals and alkaline earth metals. Most alkali and alkaline earth halogenates are to a large extent soluble in water. Sodium iodate, potassium chlorate, potassium bromate, magnesium iodate and calcium iodate are to a less extent soluble in water. Detailed data on the solubility of alkali and alkaline earth halogenates in water can be found in books by W.F. Linke "Solubilities of Inorganic and Metal-Organic Compounds," Vol. I (1958) and Vol. II (1965). Halogenates are more or less liable to self-decomposition in an acid medium. Self-decomposition in an acid medium occurs to a lesser extent in case of halogenates whose solubility in water is poor. For this reason which halogenates are preferred. Calcium iodate is such a halogenate. If desired, the solubility of a halogenate may be decreased by addition of a further salt which is satisfactorily soluble in water and which has an ion in common with the halogenate. Thus, for example, the solubility of potassium chlorate, bromate or iodate may be decreased by addition of a further potassium salt, for example, $KH_2PO_4$.

A solution of a mineral acid, for example, sulphuric acid, phosphoric acid or perchloric acid or of an organic sulphonic acid, for example, methane sulphonic acid, 1,2-ethane disulphonic acid or trifluoromethane sulphonic acid may be used as an electrolyte in the cathode half-cell. The same electrolyte may be used for the anode half-cell. The acid concentration is not to be chosen too high, because at a higher acid degree gas evolution occurs due to self-decomposition of the halogenates. Suitable acid concentrations are 1–4 N (1–4 g.eq./1).

The separator to be used in the primary cell according to the invention must be resistant to the materials used in the cell and hence to the oxidatively brominating or chlorinating action of the content of the cathode space. Cation-selective diaphragms consisting of polysulphonic acid polyolefines are suitable as separators and, for example, polysulphonic acid-polyethylene and polysulphonic acid - polypropylene or such materials obtained by sulphochlorination of diaphragms of polyolefines such as polyethylene and polypropylene, for example, in a manner as described in United Kingdom Patent Specification 981,562 and in United States Patent Specification 3,388,080, respectively.

The selectivity of a cation-selective diaphragm thus obtained can be considerably improved by providing in the pores of the diaphragm a precipitate of a material which is substantially insoluble in the electrolytes used in the primary cell. A precipitate which yields particularly satisfactory results is a precipitate consisting of $Zr(HPO_4)_2 \cdot H_2O$. The precipitate may be provided, for example, in a manner as described hereinafter.

A cell according to the invention will now be described in detail by way of example with reference to FIG. 1. In this Figure the reference numeral 2 denotes the anode space filled with a mixture obtained by mixing 11.1 g of phosphorous, 0.5 g of iodine and 6 g of graphite fibres (obtained by processing graphite linen (commercial product) in water) and to add to the mixture thus obtained 10 cubic cm of a freshly prepared aqueous solution which contains 25 percent by weight of perchloric acid and 15 percent by weight of silica (particle size 150 – 160 A). After a short period a rigid elastic gel is obtained therefrom. The reference numeral 1 denotes the cathode space filled with a mixture obtained by mixing 14.7 g of sodium bromate, 1 g of zirconyl nitrate and 2.4 g of graphite fibres and to add to the mixture thus obtained 10 cubic cm. of a freshly prepared aqueous solution which contains 25 percent by weight of perchloric acid and 15 percent by weight of silica (particle size 150-160 A). Here, too, a gel is formed after a short period. The reference numeral 3 denotes the separator (thickness 2 mms). This cylindrical separator is obtained in the following manner: in the porous wall of a tube consisting of polyethylene frit (sintered grains, pore size approximately 50 µm) a precipitate of $Zr(HPO_4)_2 \cdot H_2O$ is formed by means of a 24-hour precipitation, while a phosphoric acid solution (containing 3 mol of $H_3PO_4$ and 3 mol of HCl per litre) is provided inside the tube and a zirconyl chloride solution (containing 0.5 mol of $ZrOCl_2$ and 3 mol of HCl per litre) is provided outside the tube. Subsequently the tube is heated in a diluted, 2 percent by weight aqueous phosphoric acid solution for 3 hours at approximately 90°C in order to remove the chloride ions from this precipitate. In the finished cell the formation of a precipitate of $Zr(HPO_4)_2 \cdot H_2O$ takes place in the separator by means of precipitation because zirconyl ions are present in the cathode liquid (within the separator) and phosphoric acid is present in the anode liquid, outside the separator. In this manner pores possibly brought about in the precipitation layer consisting of $Zr(HPO_4)_2 \cdot H_2O$ are filled up).

The lower side of the cathode space 1 is closed by means of asphalt (3a) and the upper side is closed by means of parraffin (3b). The reference numeral 4 denotes a carbon rod (diameter 5 mms) which serves as a collector (+terminal), the reference numeral 5 denotes a cylinder of graphite (–terminal) formed by moulding, 6 denotes the housing of acid-resistant steel, 7 denotes a washer of porous polyethylene, 8 denotes a polythene closure plate and 9 denotes a brass cap (+terminal).

Figure 2:
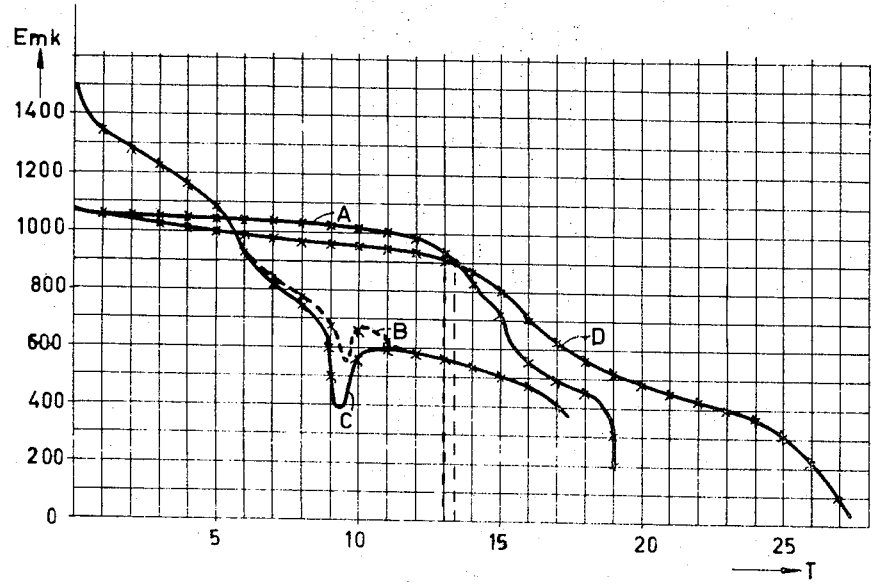
Figure 3:
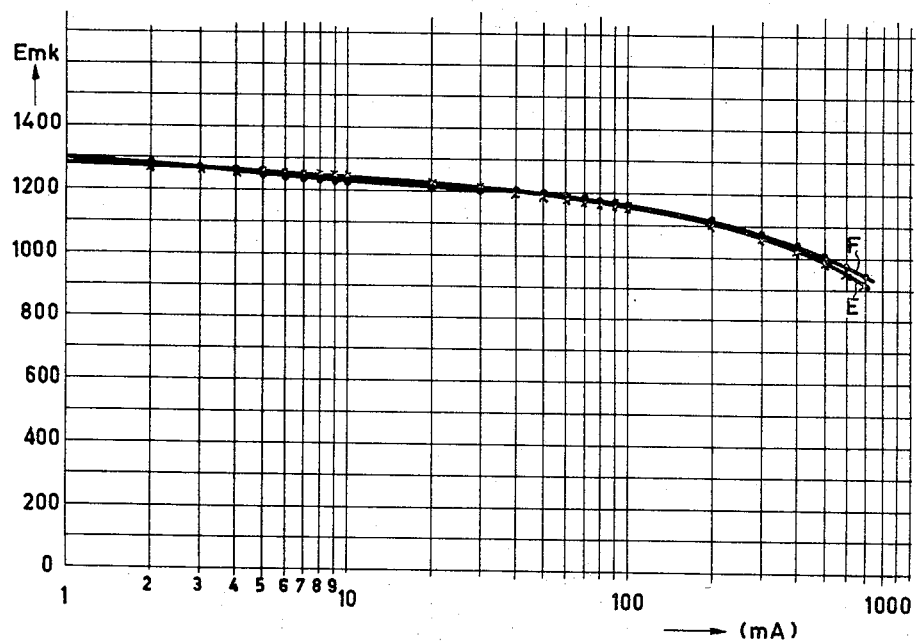

This cell was discharged at a constant current of 300 mA. The result of the measurement of the working voltage (EMF in mV) as a function of time (T, in hours) is shown in FIG. 2, curve A. In FIG. 3, curve E, the current voltage characteristic is given for the same element at which the working voltage (EMF in mV) is shown as a function of the current intensity (in mA).

The results of the measurements prove that the performance under load of the cell is very satisfactory and that the discharge curve at a continuously high load is substantially horizontal. The cell has a theoretical capacity of 13.1 Ah. The output at the continuous load of 300 mA is 43 percent. (Theoretical capacity and output are both calculated on the quantity of bromate).

When a manganese dioxide/ammonium chloride/zinc cell was compared, it was found that the described cell according to the invention has a better performance under load and particularly the discharge curve had a more level shape at high load. In FIG. 2 the curves B and C show this. These curves relate to measurements of the working voltage (EMF) as a function of time (T) at a discharge current of 300 mA on two manganese dioxide/ammonium chloride/zinc cells having the same dimensions of the Heavy Duty R20 type. The dimensions of the above-described cells according to the invention were substantially the same as those of the last-mentioned manganese dioxide cells.

Measurements were also performed on a cell according to the invention of the same construction as shown in FIG. 1, in which the anode space contained a mixture of 5.1 g phosphorus, 0.5 g iodine and 4 g graphite fibres. The cathode-spaced contained a mixture of 10.2 g sodium bromate, 1.0 g zirconyl nitrate and 5 g graphite fibres. Added to each mixture were 10 cubic cm of a freshly prepared aqueous solution containing 25 percent by weight of perchloric acid and 15 percent by weight of silica. This cell was also discharged at a constant current of 300 mA. FIG. 2, curve D shows the results of the measurements working voltage (EMF) as a function of time (T). In FIG. 3 curve F shows the current voltage characteristic for this cell at a constant discharge current of 300 mA; the working voltage (EMF in mV) is shown as a function of time (T, in hours).

The theoretical capacity of this cell was 9.1 Ah and the output at the continuous load of 300 mA was 89 percent, both calculated on the quantity of bromate present.

The output of this cell is considerably higher than that of the previously described cell according to the invention. It is assumed that this may be ascribed to the use of a quantity of graphite fibres which is larger in proportion to the quantity of bromate.

The invention will be further described hereinafter.

Figure 4:
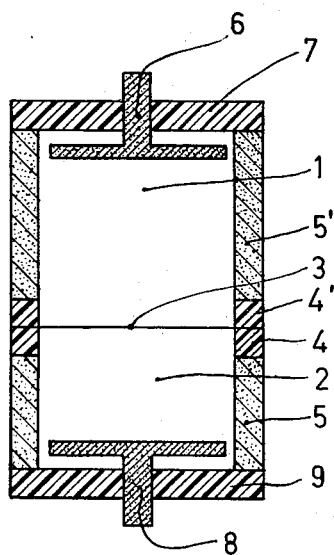

It was found that a very suitable embodiment of a primary cell according to the invention is an embodiment a longitudinal section of which is shown in FIG. 4. Externally, the cell may have the dimensions of the commonly used Leclanche cells and may have different forms and this, for example, in such a manner that a cross-section is circular or substantially rectangular. One of the special features of the embodiment of FIG. 4 is that the separator 3 which separates the cathode space 1 and the anode space 2 is flat or substantially flat and constitutes substantially one assembly with a part 4 of the wall of the cell. The embodiment of FIG. 4 will now be described in greater detail with reference to an Example.

Example 1

In FIG. 4 the reference numeral 2 denotes the anode space filled with a mixture obtained by mixing 3 gms of phosphorus, 1 g of acetylene black, 0.5 gms of iodine and 1 g of graphite felt and by adding to the mixture 7 cubic cms of an aqueous solution comprising 25 percent by weight of $KHSO_4$. The reference numeral 1 denotes the cathode space filled with a mixture obtained by mixing 7.2 gms of $KBrO_3$ and 2 gms of graphite felt and by adding to the mixture thus obtained 7 cubic cms of an aqueous solution comprising 25 percent by weight of $KHSO_4$. The reference numeral 30 denotes the separator. This separator is obtained in the following manner: A polyethylene foil (thickness 200 μm) was secured by means of fusing to the rings 4 and 4' of poly trifluoromonochloroethylene and was subsequently sulphonated in a manner known for sulphonating polyethylene. Subsequently the rings 4 and 4' fused together and fused to the separator were connected by means of fushing to the cylinders 5 and 5' (diameter 26 mms) of polytrifluoromonochloroethylene. The cathode space 1 accommodates a carbon body 6 which is connected in an electrically conducting manner to the graphite felt of the above-mentioned mixture which is present in this space and likewise the anode space 2 accommodates a carbon body 8 which is connected in an electrically conducting manner to the acetylene black of the above-mentioned mixture which is present in this space. The upper side of the cathode space 1 is closed by means of a cover 7 of polytrifluoromonochloroethylene which is connected by means of fusing to the cylinder 5 and likewise the lower side of the anode space is closed by a bottom 9 of polytrifluoromonochloroethylene which is connected by means of fusing to the cylinder 5'.

The working voltage of this cell was 1.15 volts. The cell was loaded at a current of 500 mA for 6 hours, the mean working voltage then was 700 mV. Subsequently, the cell was loaded for 12 hours at a current of 150 mA the mean working voltage then was 750 mV. At this discharge this cell supplied 4.7 Ah which corresponds to an output of approximately 81 percent calculated on the quantity of bromate used.

Example 2

The same cell as shown in FIG. 4 was manufactured, and its cathode space 1 was filled with a mixture obtained by mixing 12.0 gms of $NaBrO_3$ and 2 gms of graphite felt and by addding to the mixture thus obtained 7 cubic cms of a solution which contained 25 percent by weight of $NaHSO_4$. The anode space 2 was filled with a mixture by mixing 3 gms of phosphorus, 0.5 gm of iodine, 1 gm of acetylene black and 1 gm of graphite and by adding to the mixture thus obtained 7 cubic cm of an aqueous solution which contained 25 percent by weight of $NaHSO_4$.

The working voltage of this cell was 1.2 Volts. Subsequently the cell was loaded at a current of 150 mA for 47 hours. The mean working voltage then was 700 mV. At this discharge the cell supplied approximately 7.0 Ah which corresponds to an output of approximately 67 percent calculated on the quantity of bromate used.

Example 3

The same cell as shown in FIG. 4 was manufactured, and its cathode space 1 was filled with a mixture obtained by mixing 12.2 gms of $KClO_3$ and 2 gms of graphite felt and by adding to the mixture thus obtained 9 cubic cms of an aqueous solution comprising 20 percent by weight of $H_2SO_4$ and saturated with KCl. The anode space 2 was filled with a mixture obtained by mixing 4.0 gms of phosphorus, 0.5 gm of iodine, 1 gm of acetylene black and 1 gm of graphite felt and by adding to the mixture thus obtained 8 cubic cms of an aqueous solution which contained 20 percent weight of $H_2SO_4$ and which was saturated with KCl.

The working voltage of this cell was 1.05 Volts. The cell was loaded at a current of 50 mA for 276 hours. The mean working voltage then was 700 mV. At this discharge, the cell supplied 13.8 Ah which corresponds to an output of approximately 86 percent calculated on the amount of chlorate used.

It was found that for manufacturing primary cells according to the invention having very satisfactory properties for example loadability and lifetime, the following should be taken into account. To make such cells with the application of bromate, the pH of the electrolyte is to be between −0.3 and 2 and preferably between 0 and 0.5 the concentration of sodium and/or potassium ions is to be 1–3 g ion/l and the specific resistance is to be less than 10 ohm. cm and preferably less than 5 ohm. cm. Examples of electrolyte compositions with which such cells may be manufactured are the following:

When using potassium bromate:
a. 20 – 30 percent by weight of $KHSO_4$;
b. 20 – 30 percent by weight of $KHSeO_4$ + 0–7 percent by weight of $H_2SeO_4$;

When using sodium bromate:
c. 20 – 30 percent by weight of $NaHSO_4$;
d. 20 – 30 percent by weight of $NaHSeO_4$ + 0–7 percent by weight of $H_2SeO_4$.

To manufacture primary cells according to the invention with the application of chlorate and having very satisfactory properties, the pH of the electrolyte should be between −0.5 and 1 and preferably between− 0.3 and 0; the concentration of sodium and/or potassium ions should be 1–4 g ion/l and the specific resistance should be less than 5 ohm. cm and preferably less than 3 ohm. cm. Examples of electrolyte compositions with which such elements may be manufactured are the following When using potassium chlorate:
a. 10 – 30 percent by weight of $H_2SO_4$ + 10 – 30 percent by weight of $KHSO_4$;
b. 7 – 15 percent by weight of $H_2SeO_4$ + 10 – 30 percent by weight of $KHSeO_4$;
c. 3 – 8 percent by weight of HCl saturated with KCl;

When using sodium chlorate:
d. 10 – 30 percent by weight of $H_2SO_4$ + 10 – 30 percent by weight of $NaHSO_4$;
e. 7 – 15 percent by weight of $H_2SeO_4$ + 10 – 30 percent by weight of $NaHSeO_4$:
f. 5–15 percent by weight of $HClO_4$ + 10–30 percent by weight of $NaClO_4$;
g. 3 – 8 percent by weight of HCl saturated with NaCl.

The embodiment according to FIG. 4 of a primary cell according to the invention has the advantage that the surface of separator 3 is proportionally small. As a result the loss of iodine which is added as a mediator to the mass present in the anode space 2 is limited. This loss, which occurs because some diffusion of iodide through teh separator takes place, is substantially proportonal to the surface of the separator.

The loss of iodide due to diffusion through the separator can still further be limited by increasing its selectivity by providing an insoluble material in the pores of the separator. Such a material is, for example, mercury sulphide and the previously mentioned zirkonyl phosphate. Polyvinyl sulphonic acid may alternatively be used for this purpose. This may be provided, for example, by using a diaphragm, to be applied as s separator, as a partition between two compartments one of which comprises an aqueous solution of 26 percent by weight of Na vinylsulphonate and the other comprises an aqueous solution of 1 mol of $Na_2SO_4$, 1 percent by weight of $Na_2S_2O_8$ and 1 percent by weight of $NaHSO_3$. By diffusion of both solutions, the formation of polyvinyl sulphonic acid takes place in the pores of the diaphragm.

What is claimed is:

1. A primary electrochemical cell containing an aqueous solution of an acid as an electrolyte and consisting of a cathode half-cell and an anode half-cell separated by a separator permeable to hydrogen ions and water, the cathode half-cell containing a halogenate as a depolarizer and the anode half-cell containing phosphorus as a reactant and also a mediator for enhancing the conversion of phosphorus into phosphoric acid.

2. A primary electrochemical cell as claimed in claim 1, in which iodine is used as a mediator for enhancing the conversion of phosphorus into phosphoric acid.

3. A primary electrochemical cell as claimed in claim 1 in which a halogenate of the group consisting of potassium chlorate, potassium bromate, sodium iodate, calcium iodate and magnesium iodate is used.

4. A primary electrochemical cell as claimed in claim 3, in which a salt decreasing the solubility of the halogenate is used 5. A primary electrochemical cell as claimed in claim 4, in which a sodium halogenate is used as a halogenate and primary potassium phosphate is used as a salt decreasing the solubility of the halogenate.

6. A primary electrochemical cell as claimed in claim 4 in which an aqueous solution of an acid selected from the group consisting of phosphoric acid, sulfuric acid and perchloric acid is used as an electrolyte.

7. A primary cell as claimed in claim 3, in which electrodes consisting of carbon felt selected from the group consisting of graphite and carbon black are used.

8. A primary electrochemical cell as claimed in claim 3, in which a cation-selective diaphragm is used as a separator.

9. A primary electrochemical cell as claimed in claim 8, in which a diaphragm consisting of a polysulphonic acid polyolefine is used as a cation-selective diaphragm.

10. A primary electrochemical cell as claimed in claim 3, in which a separator is used in the pores of which a material is provided which is substantially insoluble in the electrolyte used in the cell.

11. A primary electrochemical cell as claimed in claim 10, in which the material provided in the pores of the separator and being substantially insoluble in the electrolyte used consists of $Zr(HPO_4)_2 \cdot H_2O$, 12. A primary electrochemical cell as claimed in claim 3, in which a zirconyl salt is added to the electrolyte used in the cathode half-cell and in which phosphoric acid is used as an electrolyte in the anode half-cell.

13. A primary cell as claimed in claim 3, in which bormate is used as a halogenate and in which the pH of the electrolyte lies between $-0.3$ and 2, the concentration of sodium and/or potassium ions being 1–4 g ion/l and the specific resistance of the electolyte being less than 10 ohms. cm.

14. A primary cell as claimed in claim 3 in which chlorate is used as a halogenate and in which the pH of the electrolyte lies between $-0.5$ and 1, the concentration of sodium and/or potassium ions being 1–4 g ion/l and the specific resistance of the electrolyte being less than 5 ohm. cm.

* * * * *

PO-1050
(5/69)

UNITED STATES PATENT OFFICE
CERTIFICATE OF CORRECTION

Patent No. 3,769,089             Dated     October 30, 1973

Inventor(s)   JORIS JAN CORNELIS OOMEN ET AL

It is certified that error appears in the above-identified patent and that said Letters Patent are hereby corrected as shown below:

Column 9, line 34, cancel "felt".

Signed and sealed this 9th day of April 1974.

(SEAL)
Attest:

EDWARD M. FLETCHER, JR.
Attesting Officer

C. MARSHALL DANN
Commissioner of Patents